United States Patent [19]

Leupen

[11] 4,242,393

[45] Dec. 30, 1980

[54] CARPET TILES

[75] Inventor: Willem H. L. Leupen, Picton, Australia

[73] Assignee: Heuga Australia Production Pty. Ltd., North Sydney, Australia

[21] Appl. No.: 10,193

[22] Filed: Feb. 7, 1979

[51] Int. Cl.$^3$ .............................................. E04D 1/00
[52] U.S. Cl. ........................................ 428/95; 428/97; 428/921
[58] Field of Search ................... 428/95, 96, 97, 489, 428/538, 539, 921; 106/15 FP, 281 R, 288 B, 291

[56] References Cited

U.S. PATENT DOCUMENTS

| 4,079,158 | 3/1978 | Kennepohl | 428/489 |
| 4,082,885 | 4/1978 | Rashid | 428/489 |
| 4,133,932 | 1/1979 | Peck | 428/489 |

*Primary Examiner*—Marion McCamish
*Attorney, Agent, or Firm*—Ladas & Parry

[57] ABSTRACT

An improved backing for carpet or carpet tiles is provided in which a bitumen is filled with a limestone-type filler. Carpet and carpet tiles incorporating the filled bitumen are cheaper to produce, less brittle and more fire resistant than conventional carpet or carpet tiles. Because of the nature of the filled bitumen when in a fluid state, the process for manufacturing carpet or carpet tiles of the invention differs from conventional processes.

6 Claims, 1 Drawing Figure

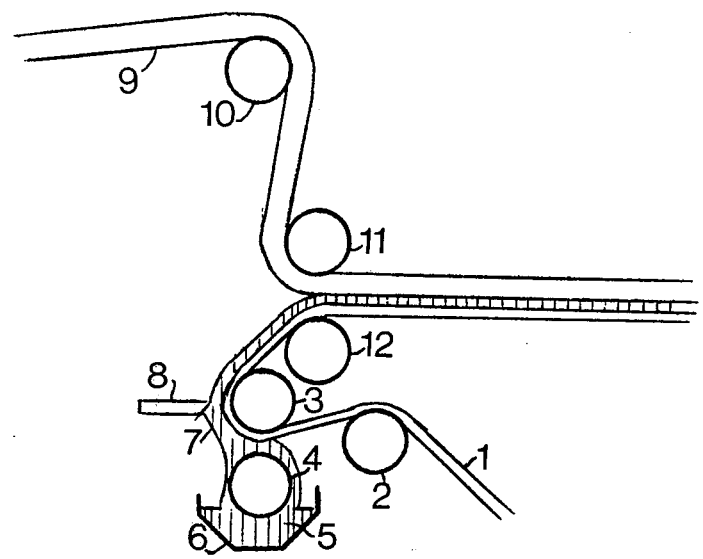

CARPET TILES

The present invention relates to carpet and carpet tiles, backings therefor, and a method of manufacture thereof. Carpet tiles comprise: a carpet, a primary backing, bitumen backing and a secondary backing.

At present carpet tiles are manufactured with a bitumen backing. The bitumen backing, while satisfactory for holding the carpet tile together and having the right physical properties to make the carpet tile durable, is unsatisfactory from a flammability standpoint. The invention provides a filled bitumen backing which overcomes the flammability problem, is cheaper to produce than the present bitumen backing and is not brittle as are known filled bitumen backings. The method of the present invention is suitable for all types of carpet tiles, needle felted, tufted and woven. All known types of secondary backing sheets are suitable provided they can withstand temperatures at which the filled bitumen backing material is fluid.

Carpet tiles are at present manufactured by applying two coatings of bitumen, e.g. a 110/20 bitumen, to the underside of a carpet to form a backing, pressing a secondary backing sheet onto the bitumen coating and, where desired, cutting the backed carpet into the desired size tiles.

The backing composition of the present invention comprises a bitumen and a limestone-type filler wherein the filler comprises particles all of which are less than 1 mm, 10% to 50% by weight of which are between 1 mm and 77μ and 90% to 50% by weight of which are less than 77μ, and wherein the combination of bitumen and filler has a ball and ring softening point of 373 K to 403 K and a penetration of 5 to 25 points. The softening point is determined according to British Standard B.S. 4692:1971, and the penetration according to British Standard B.S. 4691:1971.

It is preferred that the limestone-type filler be incorporated in the backing composition of the present invention in an amount of between 10% and 90% by weight based on the weight of the backing composition.

The carpet or carpet tile of the present invention comprises: a carpet, a filled bitumen backing as defined above, and a secondary backing sheet which is conventional in the art.

The method of the present invention comprises: admixing a bitumen and a limestone-type filler which comprises particles all of which are less than 1 mm, 10% to 50% by weight of which are between 1 mm and 77μ, and 90% to 50% by weight of which are less than 77μ, to form a filled bitumen having a ball and ring softening point of 373 K to 403 K and a penetration of 5 to 25 points, applying a layer of said filled bitumen while fluid to one surface of a secondary backing sheet which is conventional in the art, and pressing the underside of a carpet to said layer.

In this specification and claims, by a limestone-type filler is meant a non-flammable mineral filler having a particle size distribution as described above and is preferably a carbonate-type mineral such as limestone or dolomite. Choice of the filler will depend on locally available materials and price considerations.

In one embodiment of the invention the backing composition may include a further additive which is alumina trihydrate which may be incorporated in the secondary backing composition at up to 10% of the total mix. On the application of heat the alumina trihydrate releases its water of crystallisation and acts as a fire-retardant.

The following examples will illustrate preferred embodiments of the invention and should not be construed as limiting thereon.

EXAMPLE 1

The accompanying drawing shows a schemtaic diagram of a method of manufacturing carpet tiles according to an embodiment of the invention. In the drawing a secondary backing strip of non-woven polypropylene 1 is passed by means of rollers 2 and 3 over a roller 4 which picks up a mixture 5 to 45/60 bitumen and limestone having a sieve analysis 100%—16 mesh, 85%—200 mesh and 65%—300 mesh at a temperature of from 433 K to 463 K from a trough 6 thereby forming a backing layer 7 of filled bitumen. The thickness of the layer 7 is controlled by roller 3 and heated bar 8. Carpet 9 is brought to the coated polypropylene by roller 10 and the carpet tile material is formed by pressing between rollers 11 and 12. Thereafter the carpet tile material is cut to size and shape.

EXAMPLE 2

To illustrate the improved flammability properties of the carpet tiles manufactured according to the invention three tiles were subjected to the tests for early fire hazard properties of material of Australian Standard 1530 Part 3—1976. Tile A was a green carpet tile having a pile composition 80% wool 20% nylon, a pile weight of 1355 g.m$^{-2}$, total weight of 4440 g.m$^{-2}$, and a backing comprising 25% bitumen 10% alumina hydrate and 65% limestone. Tile B was a carpet tile having a pile composition 80% wool 20% nylon, a pile weight of 1355 g.m$^{-2}$, a total weight of 4440 g.m$^{-2}$ and a backing composition comprising 25% bitumen and 75% limestone. Tile C was a carpet tile having pile composition of 80% wool 20% nylon, a pile weight of 1200 g.m$^{-2}$, a pile height of 6 mm, a primary backing of woven polypropylene, a backing of bitumen, a secondary backing of polypropylene and a total weight of 4000 g.m$^{-2}$. Results of the tests are summarised in Table 1 which follows.

TABLE I

| Tile | Ignitability Index (0–20) | Spread of Flame Index (0–10) | Heat Evolved Index (0–10) | Smoke Developed Index (0–10) |
| --- | --- | --- | --- | --- |
| A | 16 | 6 | 4 | 4 |
| B | 16 | 5 | 3 | 4 |
| C | 14 | 7 | 5 | 7 |

The above table shows the superiority of the carpet tiles having a filled bitumen backing.

What I claim is:

1. A carpet or carpet tile comprising a carpet, a secondary backing sheet and a layer of a backing composition which comprises an admixture with bitumen of a limestone-type filler comprising particles all of wich are less than 1 mm, 10% to 50% by weight of which are between 1 mm and 77μ and 90% to 50% of which are less than 77μ, the combination of filler and bitumen having a ball and ring softening point of 373 K to 403 K and a penetration of 5 to 25 points.

2. A carpet or carpet tile according to claim 1 wherein said filler is present in an amount of between 10% and 90% by weight based on the total weight of said backing composition.

3. A carpet or carpet tile according to claim 2 further comprising alumina tri-hydrate in an amount of up to 10% by weight based on the total weight of said backing composition.

4. A carpet or carpet tile according to claim 1 further comprising alumina tri-hydrate in an amount of up to 10% by weight based on the total weight of said backing composition.

5. In a process for manufacturing carpet or carpet tiles, the improvement comprising admixing a bitumen and a limestone-type filler which comprises particles all of which are less than 1 mm, 10% to 50% by weight of which are between 1 mm and 77μ, and 90% to 50% by weight of which are less than 77μ, to form a filled bitumen having a ball and ring softening point of 373 K to 403 K and a penetration of 5 to 25 points, applying a layer of said filled bitumen while fluid to one surface of a secondary backing sheet which is conventional in the art, and pressing the underside of a carpet to said layer.

6. The process according to claim 5 further comprising admixing up to 10% by weight based on the weight of said filled bitumen of alumina tri-hydrate with said filler.

* * * * *

UNITED STATES PATENT AND TRADEMARK OFFICE
CERTIFICATE OF CORRECTION

PATENT NO. : 4,242,393

DATED : December 30, 1980

INVENTOR(S) : Willem H. L. LEUPEN

It is certified that error appears in the above-identified patent and that said Letters Patent are hereby corrected as shown below:

```
On the cover sheet, left column, between ICIREPAT [22] and

ICIREPAT [51], should be inserted:

--[30] Foreign Application Priority Data

February 13, 1978 [AU] Australia............ PD 3362--.
```

Signed and Sealed this

Seventh Day of April 1981

[SEAL]

Attest:

RENE D. TEGTMEYER

Attesting Officer     Acting Commissioner of Patents and Trademarks